(12) United States Patent
Jiao et al.

(10) Patent No.: US 7,065,004 B2
(45) Date of Patent: Jun. 20, 2006

(54) HORIZON-BASED RESIDUAL DEPTH MIGRATION VELOCITY ANALYSIS

(75) Inventors: Junru Jiao, Katy, TX (US); Ruben D. Martinez, Sugar Land, TX (US)

(73) Assignee: PGS Americas, Inc., Houston, TX (US)

( * ) Notice: Subject to any disclaimer, the term of this patent is extended or adjusted under 35 U.S.C. 154(b) by 34 days.

(21) Appl. No.: 10/829,549

(22) Filed: Apr. 22, 2004

(65) Prior Publication Data

US 2005/0237857 A1    Oct. 27, 2005

(51) Int. Cl.
*G01V 1/30* (2006.01)
*G01V 1/36* (2006.01)

(52) U.S. Cl. .............................. 367/51; 367/37; 367/38; 367/50; 367/52; 702/18

(58) Field of Classification Search ................. 367/37, 367/38, 50, 51, 52; 702/18
See application file for complete search history.

(56) References Cited

U.S. PATENT DOCUMENTS

| | | | | |
|---|---|---|---|---|
| 4,980,866 | A * | 12/1990 | Wang et al. ................... | 367/52 |
| 5,128,899 | A * | 7/1992 | Boyd et al. .................... | 367/50 |
| 5,500,832 | A * | 3/1996 | Berryhill ...................... | 367/51 |
| 6,546,339 | B1 * | 4/2003 | Bevc et al. .................... | 702/18 |
| 6,577,955 | B1 * | 6/2003 | Guillaume ................... | 702/14 |
| 2002/0042678 | A1 * | 4/2002 | Bevc et al. .................... | 702/18 |
| 2002/0180732 | A1 * | 12/2002 | Docherty ..................... | 345/424 |
| 2003/0083820 | A1 * | 5/2003 | Ren et al. ...................... | 702/18 |
| 2003/0208321 | A1 * | 11/2003 | Martinez et al. ............... | 702/14 |
| 2004/0162667 | A1 * | 8/2004 | Abe et al. ..................... | 701/109 |

OTHER PUBLICATIONS

Ahmed, Stoffa, and Sen. "Residual migration velocity analysis in the offset-depth domain." Journal of Seismic Exploration 12, 237-257 (2003).*

Stoffa, P.L., Buhl, P., Diebold, J.B., and Wenzel, F., *Direct mapping of seismic data to the domain of intercept time and ray parameter—A plane-wave decomposition*, Geophysics, 1981, pp. 255-267, vol. 46.

Al-Yahya, K., *Velocity analysis by iterative profile migration*, Geophysics, 1989, pp. 718-729, vol. 54.

Meng, Z., Bleistein, N., and Wyatt, K.D., *3-D Analytical migration velocity analysis I: Two-step velocity estimation by reflector-normal update*, 69th Annual International Meeting, Society of Exploration Geophysicists, Expanded Abstracts, 1999, pp. 1727-1730.

(Continued)

*Primary Examiner*—Jack Keith
*Assistant Examiner*—Scott A. Hughes
(74) *Attorney, Agent, or Firm*—E. Eugene Thigpen; Richard A. Fagin

(57) ABSTRACT

A method is disclosed for processing seismic data. The method includes prestack depth migrating the seismic data to generate common image gathers using an initial velocity-depth model. Horizons in the migrated seismic data are selected. Residual migration velocity analysis in the depth-offset domain is performed with respect to each selected horizon, and the velocity-depth model is updated based on the residual migration velocity analysis.

6 Claims, 4 Drawing Sheets

OTHER PUBLICATIONS

Akbar, F.E., Sen, M.K., and Stoffa, P.L., *Prestack plane-wave Kirchhoff migration in laterally varying media*, Geophysics, 1996, pp. 1068-1079, vol. 61.

Tanis, M.C., *Prestack Split-step Fourier Depth Migration Algorithms and Parallel Implementation on Cray T3E*, Ph.D. Dissertation, The University of Texas at Austin, 1998.

Whitmore, N.D. and Garing, J.D., *Internal velocity estimation using iterative prestack depth migration in the constant angle domain*, The Leading Edge, 1993, pp. 757-762, vol. 12, No. 7.

Deregowski, S.M., *Common-offset migrations and velocity analysis*, First Break, 1990, pp. 225-234, vol. 8, No. 6.

Jiao, J., P.L. Stoffa, Sen, M.K., Sen, Seifoullaev, R.K., *Residual migration-velocity analysis in the plane-wave domain*, Geophysics, 2002, pp. 1258-1269, vol. 67.

Jiao, J., *Residual Migration Velocity Analysis in the Plane Wave Domain: Theory and Applications*, Ph.D. Dissertation, The University of Texas at Austin, 2001.

\* cited by examiner

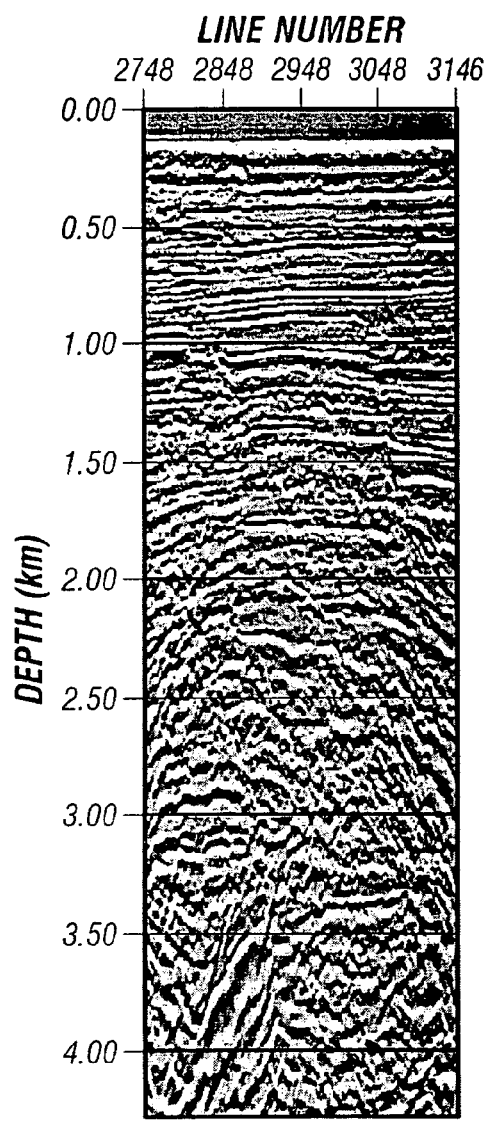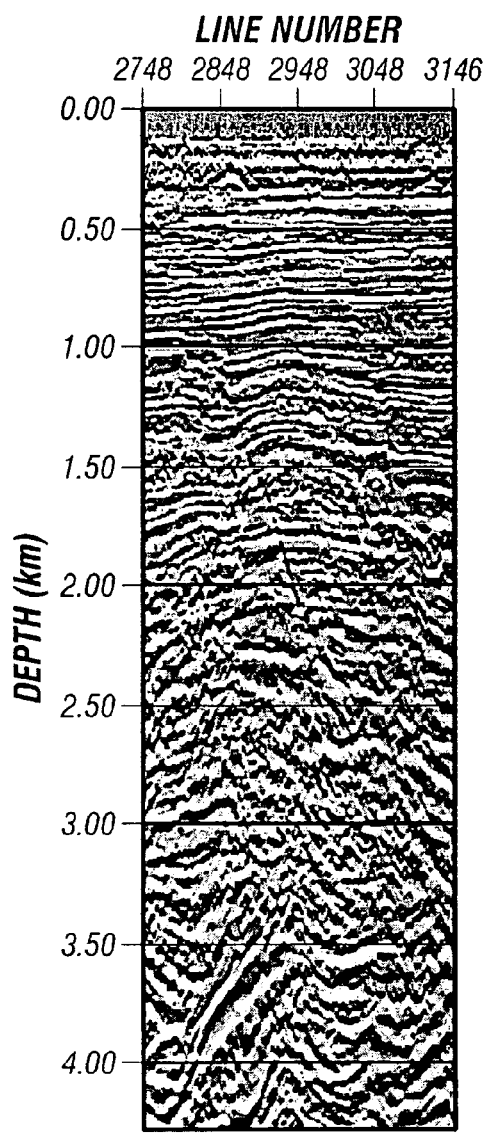
Migrated image using initial velocity model
FIG. 3a
Migrated image using updated velocity model
FIG. 3b

HORIZON-BASED RESIDUAL DEPTH MIGRATION VELOCITY ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data processing. More specifically, the invention relates to methods for migrating seismic data to correct arrival times and apparent depths of reflective events for changes in the contour of subsurface reflective horizons and for changes in velocity of the formations through which seismic energy propagates.

2. Background Art

Seismic surveying is used to determine structures of, to determine compositions of, and to determine fluid content of subsurface earth formations, among other uses. A particular application for seismic surveying is to infer the presence of useful materials, such as petroleum, in the subsurface earth formations. Generally, seismic surveying includes deploying an array of seismic sensors at or near the earth's surface at selected geographic positions, and deploying one or more seismic energy sources at selected locations, also at or near the earth's surface. The one or more seismic energy sources are actuated and seismic energy emanates from the source(s), traveling generally downwardly through the earth's subsurface until it reaches one or more acoustic impedance boundaries in the earth. Seismic energy is reflected from the one or more impedance boundaries, where it then travels upwardly until being detected by one or more of the seismic sensors. Structure and composition of the earth's subsurface is inferred from the travel time of the reflected seismic energy, from the geographic position of the source to each of the sensors and from the amplitude and phase of the various frequency components of the reflected seismic energy with respect to the energy emanating from the seismic source.

Structures of the earth's subsurface are inferred from the travel time of the seismic energy from the source to the acoustic impedance boundaries and back to the seismic sensors at the surface. In order to infer depth of and the structures of subsurface earth formations from reflection seismic travel times measured at the earth's surface, it is necessary to determine the acoustic velocity of the various formations through which the seismic energy passes. Velocities of the earth formations can vary both with respect to depth in the earth (vertically), and with respect to geographic position (laterally). Seismic data, however, are recorded only with respect to time. Methods known in the art for estimating velocities of the earth formations both vertically and laterally rely on inferences about the travel path geometry of the seismic energy as it travels from the seismic source to the various seismic receivers deployed at or near the earth's surface.

Migration is a process performed on seismic data in which depth estimates to one or more reflective horizons (acoustic impedance boundaries) in the earth are made from the "two-way" travel time of seismic energy from the seismic energy source to the reflective horizons and back to the seismic receivers. The depth estimates of the reflective horizons are computed and are displayed with respect to geographic position. Depth estimates based on two-way travel time must be corrected for energy travel path differences between the various seismic energy source and receiver geographic positions that are used during data acquisition. In order to correct the depth estimates for the various source and receiver positions, it is necessary to accurately estimate the velocity of seismic energy in the earth from the earth's surface (or the ocean bottom in marine seismic data) to each subsurface reflective horizon. Methods are known in the art for estimating velocity from two-way travel time from the seismic source to the reflective horizons and back to the seismic receivers. One such method uses two-way travel times for source and receiver arrangements which have a "common mid point" along the seismic energy travel path. Acoustic velocities of the earth formations from the earth's surface to a particular subsurface reflector can be estimated using the familiar Dix equation, for example. Other methods for estimating velocity are known in the art.

According to wave propagation theory well known to those skilled in the art, a spherical seismic energy wave propagating from a "point" source (a source modeled for calculation purposes as having essentially zero volume or spatial extent) can be decomposed into a series of plane waves. See, for example, Stoffa, P. L., Buhl, P., Diebold, J. B., and Wenzel, F., *Direct mapping of seismic data to the domain of intercept time and ray parameter—A plane-wave decomposition*: Geophysics, 46, 410–421 (1981). The Stoffa et al. article describes a method for decomposing seismic reflection data into plane waves by slant stacking, i.e., transforming seismic data into the plane wave (τ-p) domain (τ=intercept time and p=ray parameter), and further documents some advantages of processing seismic data in the plane wave (τ-p) domain, including, for example, linear noise attenuation or normal move-out in a horizontally stratified medium without approximation. Using stacking velocity analysis performed in the offset-time (x-t) domain, by contrast, provides RMS (root mean square) velocities. The RMS velocities can then be converted into interval velocities when required. Advantageously, velocity analysis in the plane-wave domain results in the estimation of interval velocities directly. Having accurate estimates of interval velocities is important for performing migration.

Some of the research in prestack migration velocity analysis began in the early 1990's. See, for example, Al-Yahya, K., *Velocity analysis by iterative profile migration*, Geophysics, vol. 54, pp. 718–729 (1989). Various analytic functions have been derived to express the relationship between the true velocity (or the ratio of the migration velocity and the true velocity) and the offset in a common image gather (CIG) in the depth-offset domain after migration. The foregoing analytic functions make use of the assumptions of a small dip (rate of change of depth with respect to lateral displacement), small offset, and/or constant velocity in the various layers of the earth's subsurface. Residual moveout analysis has also been used to extend the application of such analytic functions to media having lateral velocity variation. See, for example, Meng, Z, Bleistein, N, and Wyatt, K. D, 3-D *Analytical migration velocity analysis I: Two-step velocity estimation by reflector-normal update*, 69th Annual International Meeting, Society of Exploration Geophysicists, Expanded Abstracts (1999).

Most of the migration methods known in the art are implemented in the depth-offset domain (z-x), and a top-down "layer stripping" migration method is then used to derive the interval velocities. It is known in the art to use the depth-offset domain because this is the domain in which most prestack depth migration is performed, and the domain in which migrated CIG's are available for analysis. However, it is also known in the art to perform prestack depth migration in the plane-wave (τ-p) domain. See, for example, Akbar, F. E., Sen, M. K., and Stoffa, P. L, *Prestack plane-wave Kirchhoff migration in laterally varying media*, Geophysics, 61, 1068–1079 (1996). See also, Tanis, M. C., *Prestack Split-step Fourier Depth Migration Algorithms and Parallel Implementation on Cray T3E*, Ph.D. Dissertation, The University of Texas at Austin (1998). After migration in the plane wave domain, seismic data are displayed or presented in the depth-plane wave (z-p) domain. Prestack depth migration using slant stack (τ-p) data and a substantially correct interval velocity-depth model generate events in a common image gather (CIG) in the depth-plane wave (z-p) domain which are substantially horizontally aligned, because a CIG represents an image of the same subsurface position obtained along different seismic travel path angles. See, for example, Whitmore, N. D. and Garing, J. D., *Interval velocity estimation using iterative prestack depth migration in the constant angle domain*, The Leading Edge, vol. 12, no. 7, pp. 757–762 (1993).

Use of an erroneous velocity-depth model in migration, however, can cause misalignment of reflective events in a CIG, meaning that the reflective events displayed on the CIG exhibit a residual "moveout." By analyzing the residual moveout (a change in apparent depth with respect to ray parameter) in the CIG, it is possible to derive depth and velocity corrections, thus obtaining an updated velocity-depth model. For example, if the velocity used in the migration process is lower than the true velocity, the event appears to curve upwardly in the depth-plane wave (z-p) domain after prestack depth migration. If the velocity used in the migration process is higher than the true velocity, then the events in the CIG appear to curve downwardly.

For some time, a method known as the "vertical velocity update method" has been used to generate a velocity-depth model for prestack depth migration. A typical data processing procedure used in such methods is known as the "Deregowski loop." See Deregowski, S. M., *Common-offset migrations and velocity analysis*, First Break, vol. 8, no. 6, pp. 224–234 (1990). Residual velocity analysis can be applied at all depths based on the constant velocity assumption. See, Al-Yahya, K. (1989), *Velocity analysis by iterative profile migration*, Geophysics, vol. 54, pp. 718–729. Then the constant velocities are converted to interval velocities for a subsequent iteration. If it is desired to obtain the interval velocities from migrated seismic data directly, it is necessary to perform both prestack depth migration and the velocity analysis in a top-down "layer-stripping" procedure.

More recently, a method has been developed to update interval velocities using residual analysis in the depth-plane wave domain. See, Jiao, J., Stoffa, P., Sen, M., and Seifoullaev, R., *Residual migration velocity analysis in the plane-wave domain*, Geophysics, vol. 67, pp. 1258–1269 (2002). See also, Jiao, J., *Residual Migration Velocity Analysis in The Plane Wave Domain: Theory and Applications*, Ph.D. Dissertation, The University of Texas at Austin (2001). The method disclosed in the foregoing reference eliminates the need to perform "layer-stripping" prestack depth migration in order to obtain interval velocities. However, the method disclosed in the Jiao et al. article requires that prestack migration be performed in the depth-plane wave domain (z-p), which limits the application of that method. It is desirable to have a method for performing prestack migration in the depth-offset (z-p) domain which includes updating of interval velocities.

SUMMARY OF THE INVENTION

One aspect of the invention is a method for processing seismic data. The method includes prestack depth migrating the seismic data using an initial velocity-depth model. At least one horizon in the migrated seismic data is selected. Residual migration velocity analysis in the depth-offset domain is performed with respect to the at least one selected horizon, and the velocity-depth model is updated based on the residual migration velocity analysis. In some embodiments, a deeper horizon is selected, and residual migration velocity analysis is again performed on the deeper horizon. Based on the residual migration velocity analysis on the deeper horizon, the velocity-depth model is again updated.

Another aspect of the invention is a computer program stored in a computer readable medium. The program contains logic operable to cause a programmable computer to perform the following steps. Seismic data are prestack depth migrated using an initial velocity-depth model. At least one horizon in the migrated seismic data is selected. Residual migration velocity analysis in the depth-offset domain is performed with respect to the at least one selected horizon, and the velocity-depth model is updated based on the residual migration velocity analysis. In some embodiments, a deeper horizon is selected, and residual migration velocity analysis is again performed on the deeper horizon. Based on the residual migration velocity analysis on the deeper horizon, the velocity-depth model is again updated.

Other aspects and advantages of the invention will be apparent from the description and claims which follow.

BRIEF DESCRIPTION OF THE DRAWINGS

FIGS. 3a and 3b show, respectively, a depth migrated seismic section using a velocity depth model from a conventional velocity analysis method, and a depth migrated section using a velocity depth model derived from residual migration velocity analysis according to the invention.

DETAILED DESCRIPTION

For purposes of understanding the invention, it is helpful to review briefly the process of residual migration velocity analysis in the depth-plane wave domain. A trial slowness (the inverse of velocity), represented by $u_j^m$, of the $j^{th}$ layer of a substantially horizontal, plane-layered medium, having a total number N of such layers, is used for prestack depth migration. Any difference between the true slowness $u_j$ of the $j^{th}$ layer and the trial slowness $u_j^m$ will result in a misfit between the true depth z and the migration-calculated depth $z^m$. The misfit is referred to as the residual difference, $z_{res}$, or "residual moveout" and can be determined with respect to the ray parameter p by the following expression:

$$z_{res}(p) = \sum_{j=1}^{N} \Delta z_j^m(p) \left\{ \frac{[(u_j^m)^2 - p^2]^{1/2}}{(u_j^2 - p^2)^{1/2}} - 1 \right\} \quad (1)$$

where $u_j$ and $\Delta z_j$ represent, respectively, the true slowness and the vertical thickness of the $j^{th}$ layer, and $\Delta z^m{}_j$ represents a trial thickness of the $j^{th}$ layer. See, Jiao, J., Stoffa, P., Sen, M., and Seifoullaev, R., *Residual migration velocity analysis in the plane-wave domain*, Geophysics, 67, 1258–1269 (2002) for a derivation of the foregoing residual moveout equation. In another implementation, the residual difference $z_{res}(p)$ can be calculated by the expression below:

$$z_{res}(p) = \sum_{j=1}^{N} \Delta z_j^m(p=0) \cdot \frac{u_j^m}{u_j} \cdot \left\{ 1 - \frac{[(u_j)^2 - p^2]^{1/2}}{[(u_j^m)^2 - p^2]^{1/2}} \right\} \quad (1a)$$

Equation (1a) is more efficient in some practical applications than equation (1) because equation (1a) contemplates calculation of the depth residual using only the layer thickness corresponding to a ray parameter value equal to zero.

Equations (1) and (1a) each describe the depth residuals in depth-migrated results as a function of the ray parameter p, the true slowness $u_j$ and the trial slowness $u_j^m$. The true depth, z, of a particular subsurface earth layer can be calculated from the migration calculated depth and the residual by the following equation:

$$z = z^m(p) + z_{res}(p) \quad (2)$$

Figure 1:
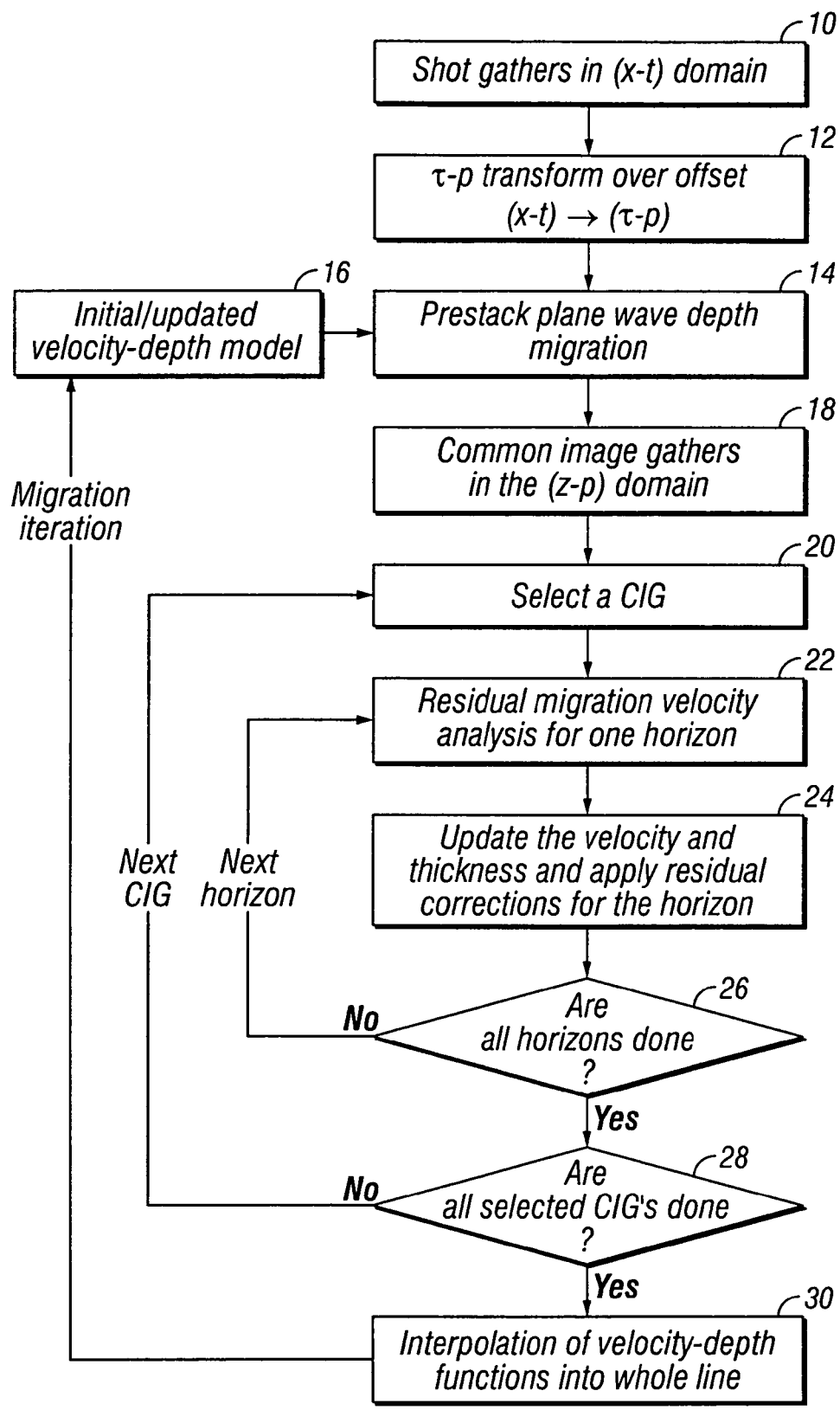
FIG. 1 shows a flow chart of a prior art residual migration velocity analysis method.

A practical implementation of the process described with reference to equations (1), (1a) and (2) used to perform depth migration in the depth-plane wave domain is shown as a flow chart in FIG. 1. At 10, seismic data are recorded with respect to the time of actuation of a seismic energy source. The data recordings are each identified with respect to the individual receiver which made the particular recording. Each recording thus has associated therewith a distance between the source and the individual receiver (called "offset") at the time of recording. Thus, the recordings may be mathematically represented in the time-offset (x-t) domain. At 12, the recordings are transformed from the time-offset domain into the plane wave (τ-p) domain. An initial velocity model, at 16, is used to perform prestack depth migration, at 14, in the plane wave domain. At 18, common image gathers ("CIGs") of the migrated seismic data are generated. At 20, one or more of the CIGs are selected for processing, and at 22, residual migration velocity analysis is performed as explained above with respect to equations (1) or (1a), and (2) on the selected CIGs for a first selected reflective event or "horizon." The migration residual velocity analysis includes calculating the depth residual with respect to the ray parameter using either equation (1) or (1a). A small perturbation within a selected range is added to the migration slowness, and the depth residual with respect to ray parameter is calculated again. The perturbation is changed and the depth residual calculation is repeated until the entire selected range of perturbations has been applied to the migration velocity. The perturbation which results in the "flattest" apparent depth of the first reflective horizon is then selected. The selected perturbation is then added to the trial slowness to generate an estimated true slowness for the first reflective horizon.

At 24, the initial velocity model and a layer thickness model are adjusted with respect to the residual migration velocity analysis performed at 22. At 26, if additional reflective horizons deeper than the first reflective horizon are to be processed, the selected CIGs are then subjected to a residual velocity analysis, at 22, with respect to the next selected event or horizon in the each of the CIGs. As with the first selected event or horizon, in the next, and in any successive horizons, a range of perturbations is applied to the slowness of the particular layer, and the perturbation which when added to the initial slowness for the layer provides the flattest relationship of migration depth with respect to ray parameter is added to the initial slowness to estimate the true slowness for the particular layer.

At 28, if additional CIGs are to be processed, the process returns to CIG selection, at 20. If all selected CIGs have been processed, then the velocity-depth model is updated, at 16, and prestack depth migration can be performed again, as shown at 14, using the updated velocity-depth model. The process can be repeated until all the selected CIGs are processed. At 30, the updated velocity-depth models can be interpolated into an entire line of seismic recordings.

The foregoing process can be extended from the depth-plane wave domain to the depth-offset domain. The theoretical basis for such extension can be understood as follows. For a seismic energy ray traveling from a seismic energy source to a seismic receiver through a substantially horizontally stratified medium, the following relationship exists between the offset x and the ray parameter p:

$$x(p) = \int_0^{z(p)} \frac{2pV(z)dz}{(1 - p^2 V^2(z))^{1/2}} \quad (3)$$

in which V(z) represents the velocity of the medium With respect to depth, x represents the distance between the seismic source and the particular receiver (the offset) and p represents the ray parameter. The ray parameter p can be determined with respect to the offset x by virtually inverting equation (3):

$$p(x) = inv\{x(p)\} \quad (4)$$

Substituting equation (4) into the depth residual equation (1), the depth residual for a 1-dimensional medium in the depth-offset domain can be determined from the slowness and the offset x by the expression:

$$Z_{res}(x, p(x)) = \sum_{j=1}^{j=N} \left\{ \Delta Z_j^m(x) \left[ \frac{[(u_j^m)^2 - p^2(x)]^{1/2}}{[u_j^2 - p^2(x)]^{1/2}} - 1 \right] \right\} \quad (5)$$

in which $u_j$, $u_j^m$ and p represent the same parameters as in equation (1). If depth residual equation (1a) is used for the residual depth analysis instead of equation (1), equation 5 may be substituted by the following:

$$Z_{res}(x) = \sum_{j=1}^{N} \Delta z_j^m(x=0) \cdot \frac{u_j^m}{u_j} \cdot \left\{ 1 - \frac{[(u_j)^2 - p^2(x)]^{1/2}}{[(u_j^m)^2 - p^2(x)]^{1/2}} \right\} \quad (5a)$$

After determining the residual depth correction, a corrected depth in the depth-offset domain can be determined for each subsurface layer using the expression:

$$z(x) = z^m(x) + z_{res}(x) \qquad (6)$$

The residual depth correction determined using equation (6) can then be used for migration velocity analysis.

In deriving the depth residual equations above, it was assumed that both the migration slowness $u_j^m$ and the true slowness $u_j$ are known for each layer. As a practical matter, however, the true slowness $u_j$ is the parameter to be determined by migration velocity analysis, and the migration slowness $u_j^m$ is an approximation of the true slowness used when performing the migration. Thus, as in the case for residual depth analysis in the plane wave domain, residual depth analysis in the offset domain can be performed by applying a perturbation from within a range of perturbations to the migration slowness $u_j^m$ to generate a new slowness value $u_j^{new} = u_j^m + u_j^{res}$. In the foregoing expression, $u^{res}$ represents the slowness perturbation and may be called the "residual slowness." The closer the new slowness $u_j^{new}$ is to the true slowness, the "flatter" reflective events will appear on a common image gather (CIG) with respect to offset, after applying the residual depth corrections. In one implementation, an initial value of slowness perturbation is applied to the initial value of migration slowness, and the flatness in the CIG is determined with respect to offset along a first selected event or horizon. The slowness perturbation value is changed, and a new value of migration slowness is then determined. CIG event flatness is again determined. Changing the slowness perturbation value, and calculating the CIG event flatness is repeated until the entire selected range of slowness perturbation values is covered. The value of the slowness perturbation which results in the greatest degree of flatness is added to the migration slowness value to provide a closest approximation of the true slowness for the particular layer being evaluated. The velocities can be determined as the inverse of the true slowness values thus determined. The foregoing process can then be repeated for any additional subsurface horizons desired to be analyzed in each CIG.

To obtain interval velocities using the above process, a top-down "layer stripping" technique is used. After performing the foregoing residual velocity analysis along a first selected horizon (layer) based on the initial velocity model used for the depth migration, velocities $V^m$ for the first layer are updated to $V^{new}$. Depths $Z^m$ (or thickness) for the first layer are updated to $Z^{new}$ by following equation:

$$Z^{new} = Z^m \frac{V^{new}}{V^m} \qquad (7)$$

Residual migration velocity analysis can be performed as explained above for the next selected horizon downward in depth, based on the updated velocity-depth model. The process can then be repeated for each selected horizon until all selected horizons are processed. After completing the foregoing process for all horizons at any CIG, a final velocity-depth model is obtained that is typically closer to the true velocity field than the previous model iteration or the initial model used in the depth migration. The final velocity-depth model can be used for a subsequent iteration of prestack depth migration, or can be used only to perform a residual depth or velocity correction on any one or more CIGs.

Determining the "flatness" in a CIG may be performed by determining semblance between traces in the CIG. When semblance reaches a maximum for a selected value of linear depth shift with respect to offsets, the CIG is determined to be at maximum flatness. In some embodiments, a selected threshold value for semblance (flatness) may be used instead of a maximum value.

Figure 2:
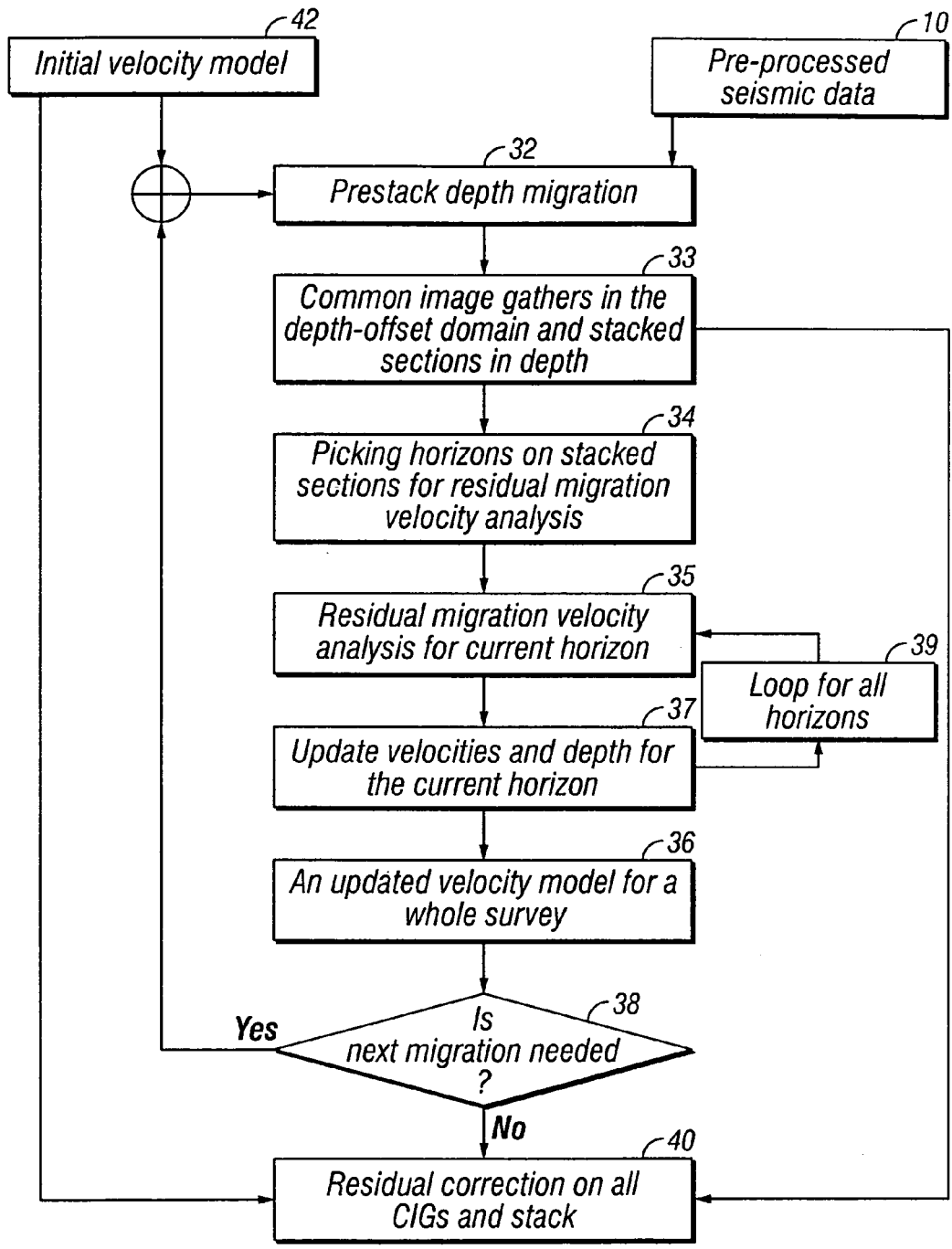
FIG. 2 shows a flow chart of an embodiment of a method of the invention.

FIG. 2 shows a flow chart of one implementation of a velocity analysis method of the invention used in seismic data processing. At 10, seismic data recorded with respect to time and receiver location (as explained above with respect to FIG. 1) are selected for processing. At 32, prestack depth migration can be performed, for example, using the Kirchhoff integral method. The prestack depth migration performed at 32 includes an initial velocity-depth model, at 42. At 33, common image gathers are generated in the depth offset domain using the velocity model from the prestack depth migration. At 34, a first reflective event, or horizon, is selected for processing. At 35, residual velocity analysis is performed in the depth-offset domain. The residual velocity analysis, as previously explained, can be performed by applying a perturbation within a selected range to the velocity from the initial migration (at 32), and determining the flatness of the selected horizon in the CIG. The velocity perturbation which when added to the initial value of velocity results in the greatest degree of flatness is added to the initial value of velocity to determine the true velocity for the layer being processed. At 37, the layer velocity, layer depth and layer thickness are updated based on the residual velocity analysis performed previously at 35. At 39, the residual velocity analysis is performed along successively deeper horizons, as explained above with respect to equations (5) through (7), until the entire velocity-depth model is updated, at 36. At 38, the updated velocities determined from the residual analysis may be used to perform another depth migration. The new depth migration will result, at 42, in an updated velocity-depth model. The process can be repeated until all selected horizons have been processed, or at 40, to perform residual corrections on common image gathers.

Methods according to the invention extend residual normal moveout (NMO) velocity and depth correction from the depth-plane-wave domain to the depth-offset domain and provide a residual depth migration velocity analysis method using common image gathers in the depth offset domain. To obtain interval velocities using methods according to the invention, it is only necessary to perform top-down layer-stripping residual corrections instead of top-down layer-stripping prestack migration. Thus methods according to the invention are particularly suitable for migration-velocity analysis, especially for large three-dimensional seismic surveys.

In a three-dimensional field data test, a good velocity-depth model was obtained after only two iterations. The velocity-depth model obtained using the field test data are shown in FIG. 3a, using prestack depth migration such as the Kirchoff integral method. Residual migration velocity analysis in the offset domain was then used to migrate the entire three-dimensional data volume again. The image was improved significantly as compared to the original depth migration, as can be observed in FIG. 3b. Methods according to the invention can also be used to perform residual correction on an entire data set that will improve the quality of stacked common image gathers.

Figure 4:
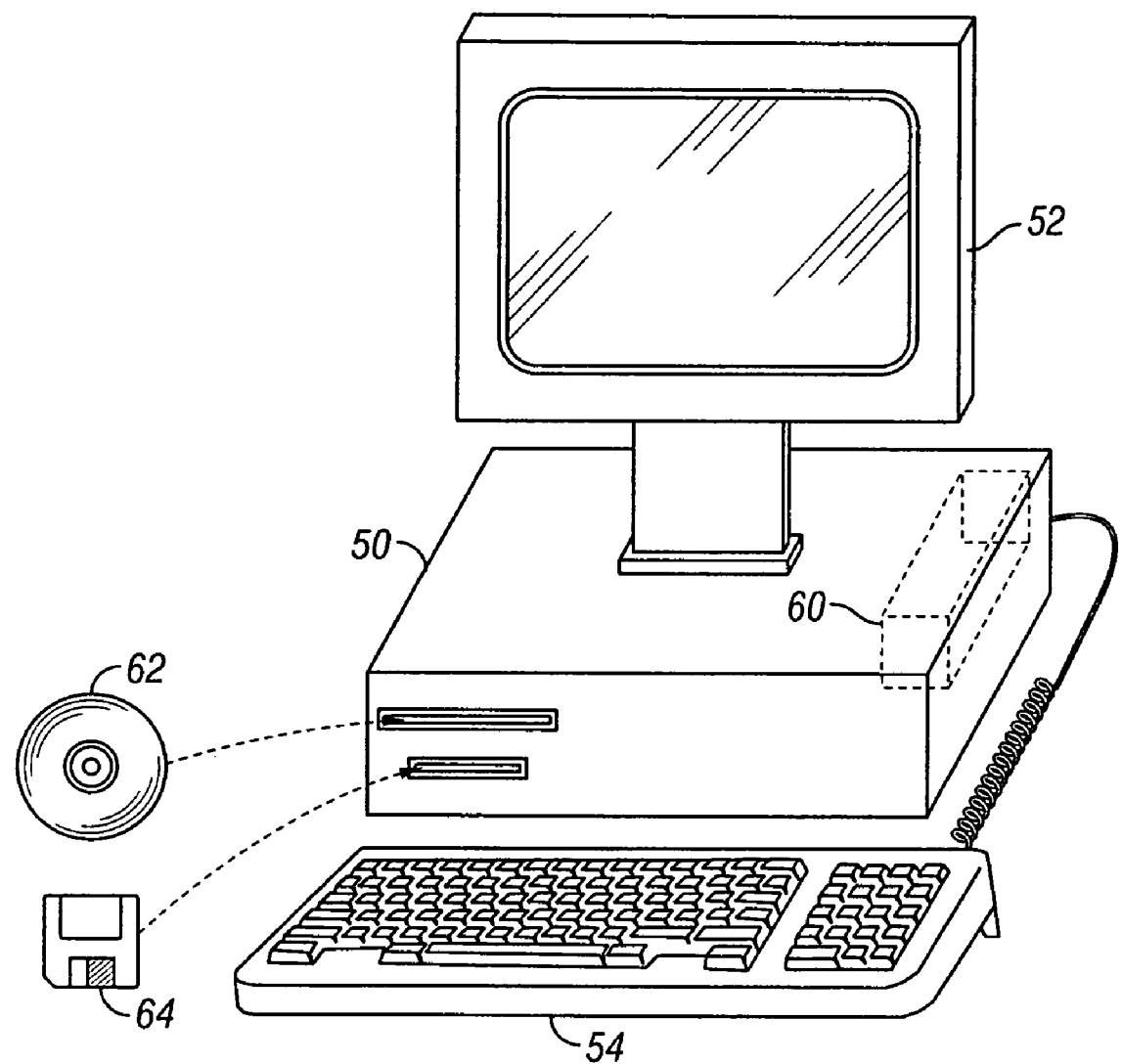
FIG. 4 shows a programmable computer used to read a program stored in a computer readable medium.

In another aspect, the invention relates to computer programs stored in a computer readable medium. Referring to FIG. 4, the foregoing process as explained with respect to FIG. 2, can be embodied in computer-readable code stored on a computer readable medium, such as floppy disk 64, CD-ROM 62 or magnetic hard drive 606 forming part of a general purpose programmable computer. The computer, as known in the art, includes a central processing unit 50, a user input device such as a keyboard 54 and a user display 52 such as a flat panel LCD display or cathode ray tube display. According to this aspect of the invention, the computer readable medium includes logic operable to cause the computer to execute steps as set forth above and explained with respect to FIG. 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing seismic data, comprising:
    prestack depth migrating the seismic data to generate common image gathers using an initial velocity-depth model;
    selecting at least one horizon in the migrated seismic data;
    performing residual migration velocity analysis in the depth-offset domain at the at least one selected horizon, the residual migration velocity analysis including calculating depth residual with respect to offset; and
    updating the velocity-depth model based on the residual migration velocity analysis.

2. The method of claim 1 wherein the prestack depth migration comprises Kirchhoff integral depth migration.

3. The method of claim 1 wherein the residual migration velocity analysis comprises:
    applying a perturbation to an initial value of slowness used in the migration;
    applying a residual moveout in a common image gather;
    determining flatness in a common image gather at a selected horizon; and
    repeating applying the perturbation, applying the residual moveout and the determining the flatness until a selected range of perturbation is covered.

4. The method as defined in claim 3 wherein the determining the flatness comprises determining a semblance between traces in the common image gather, wherein a maximum semblance corresponds to a maximum flatness.

5. The method of claim 4 wherein the updating the velocity-depth model comprises replacing migration velocities with velocities obtained from the determining semblance of the common image gather and updating depth using the velocities obtained from the determining semblance.

6. The method of claim 1 further comprising repeating the residual migration velocity analysis in the depth-offset domain on a deeper horizon than the at least one selected horizon based on the updated velocity depth model, and repeating the updating the velocity-depth model based on the repeated residual analysis.

* * * * *